United States Patent
Min et al.

(10) Patent No.: US 11,312,796 B2
(45) Date of Patent: Apr. 26, 2022

(54) POLYOLEFIN CATALYST AND METHOD FOR PREPARING POLYOLEFIN USING SAME

(71) Applicant: LOTTE CHEMICAL CORPORATION, Seoul (KR)

(72) Inventors: Joon Keun Min, Daejeon (KR); Su Jeong Jeong, Daejeon (KR); Hyun Yul Woo, Daejeon (KR); Rai Ha Lee, Daejeon (KR); Eun Hye Shin, Daejeon (KR); Byung Hun Chae, Daejeon (KR)

(73) Assignee: LOTTE CHEMICAL CORPORATION, Seoul (KR)

( * ) Notice: Subject to any disclaimer, the term of this patent is extended or adjusted under 35 U.S.C. 154(b) by 75 days.

(21) Appl. No.: 16/843,986

(22) Filed: Apr. 9, 2020

(65) Prior Publication Data
US 2021/0317239 A1 Oct. 14, 2021

Related U.S. Application Data

(63) Continuation of application No. PCT/KR2018/011978, filed on Oct. 11, 2018.

(51) Int. Cl.
*C08F 4/6592* (2006.01)
*C08F 10/06* (2006.01)
*C08F 10/02* (2006.01)

(52) U.S. Cl.
CPC .......... *C08F 4/65927* (2013.01); *C08F 10/02* (2013.01); *C08F 10/06* (2013.01)

(58) Field of Classification Search
USPC ............................. 556/8, 53; 526/128, 943
See application file for complete search history.

(56) References Cited

U.S. PATENT DOCUMENTS

| 8,071,700 B2 * | 12/2011 | Thuilliez .................. C08F 10/00 526/164 |
| 9,266,910 B2 | 2/2016 | McCullough |
| 2001/0021755 A1 * | 9/2001 | Kuber .................. B01J 31/2295 526/127 |
| 2001/0044509 A1 | 11/2001 | Holtcamp |

FOREIGN PATENT DOCUMENTS

| JP | 2016172714 A | 9/2016 |
| KR | 20110101386 A | 9/2011 |
| KR | 101485567 B1 | 1/2015 |
| KR | 101725004 B1 | 4/2017 |
| KR | 101771908 B1 | 8/2017 |
| WO | 9801456 A1 | 1/1998 |

OTHER PUBLICATIONS

Smith, James A. et al, "Ansa-metallocene Derivatives: III Influence of an Interannular Ethylene Bridge on the Reactivity of Titanocene Derivatives", Journal of Organometallic Chemistry, vol. 218, Elsevier Sequoia S.A., 1981, pp. 159-167 (7 pages).
Lee, Lawrence W. M. et al, "Zwitterionic Metellocenes Derived from rac and meso-Ethylenebisindenyl Zirconocene Olefin Complexes and Pentafluorophenyl-Substituted Boranes", Organometallics, American Chemical Society, vol. 18, No. 19, pp. 3904-3912 (9 pages).
International Search Report with English Translation issued in corresponding International Application No. PCT/KR2018/011978, dated Feb. 8, 2019 (5 pages).
Written Opinion issued in corresponding International Application No. PCT/KR2018/011978, dated Feb. 8, 2019 (4 pages).
Office Action issued in European Application No. 18865440.4 dated May 4, 2021 (8 Pages).

* cited by examiner

*Primary Examiner* — Fred M Teskin
(74) *Attorney, Agent, or Firm* — Osha Bergman Wantanabe & Burton LLP

(57) ABSTRACT

Disclosed are a novel metallocene catalyst and a method for preparing a polyolefin having a high molecular weight and a low melt index by using the same. The present invention provides a transition metal compound represented by formula 1.

10 Claims, No Drawings

POLYOLEFIN CATALYST AND METHOD FOR PREPARING POLYOLEFIN USING SAME

TECHNICAL FIELD

The present invention relates to a polyolefin catalyst and a method for preparing a polyolefin using the same, and more particularly, to a method for preparing a polyolefin having a high molecular weight and a low melt index by using a metallocene catalyst.

BACKGROUND ART

Conventionally, for the preparation of an olefin polymer, generally, a so-called Ziegler-Natta catalyst system composed of a main catalyst component of a titanium or vanadium compound and a co-catalyst component of an alkylaluminum compound has been used. However, the Ziegler-Natta catalyst system is a multi-active site catalyst in which a number of active species are mixed, and a polymer is characterized in showing broad molecular weight distribution. However, the composition distribution of a comonomer is not uniform, and there is limitation in the confirmation of desired physical properties.

A metallocene catalyst system, which is composed of a metallocene compound of a transition metal of group 4 in the periodic table, such as titanium, zirconium and hafnium and methylaluminoxane as a co-catalyst, is a homogeneous catalyst having a catalyst active site of a single species, and shows narrower molecular weight distribution of a polymer when compared with the conventional Ziegler-Natta catalyst system and uniform composition distribution of a comonomer and has the feature of changing the properties of a polymer according to the conformation change of a ligand in a catalyst.

Meanwhile, the metallocene catalyst is more expensive than the conventional Ziegler-Natta catalyst, but has an economic value due to high activity thereof. In particular, the metallocene catalyst has good reactivity with respect to a comonomer, and thus there is an advantage that a polymer having a large amount of the comonomer can be obtained with high activity even though a small amount of the comonomer is injected. Since a polymer having more uniform composition distribution and a high molecular weight may be prepared even though the same amount of the comonomer is used, the application thereof as a film or elastomer having good physical properties may be possible by using the same. In addition, since the low molecular weight wax-type extract is hardly produced in the copolymer, it can be applied to applications requiring hygiene such as medical use.

In general, it is known that an ansa-metallocene compound, which is a transition metal compound containing two ligands connected to each other via a bridged catalyst, that is, a bridged group, has good reactivity with respect to a comonomer, and the ansa-metallocene compound is used as a catalyst for preparing olefin-based homopolymers or copolymers. In particular, it is known that the ansa-metallocene compound including a cyclopentadienyl-fluorenyl ligand can produce a high molecular weight polyethylene, thereby controlling the microstructure of the polypropylene.

Despite the development of these catalysts, there is a need in the art for the development on the preparation of more effective catalysts and catalysts showing improved polymerization performance, in particular, catalysts allowing the polymer to have a high molecular weight, as well as on an olefin polymerization method using such catalysts.

On the other hand, if a generally used bisindenyl-based metallocene catalyst having a C2 symmetric structure is used, there is an advantage that the isotacticity is 95% or more, but there is a disadvantage that the copolymerization degree with ethylene is decreased, thereby reducing activity. In addition, in the case of the existing asymmetric structure metallocene catalyst (U.S. Pat. No. 9,266,910), there is a disadvantage that it is difficult to prepare a polypropylene having a low melt index (MI) due to a low molecular weight during the polymerization of polypropylene. That is, there is a problem that using the existing asymmetric structure metallocene catalyst is not suitable for the preparation of polypropylene film product having a low melt index by decreasing the molecular weight due to the rapid termination reaction. In particular, since the existing asymmetric structure metallocene catalyst is not suitable for a film product group requiring highly transparent and low volatile component characteristics which are characteristics of the metallocene polypropylene, it is impossible to use the existing asymmetric structure metallocene catalyst. Therefore, there is a need for a metallocene catalyst capable of preparing highly transparent and high-molecular-weight polypropylene by having excellent reactivity with ethylene.

Furthermore, when a cocatalyst such as a borate is used during supporting to increase the activity of the metallocene catalyst, the activity of the catalyst is increased, but rather when the equivalence ratio of the catalyst and the borate is not adequate, or the support of the borate is not perfect, the activity of the catalyst is decreased, and during the preparation of polypropylene, fine particles of the polypropylene polymerized by the catalyst are generated due to the leaching phenomenon that the catalyst is not completely attached to the support but detached from the support, thereby causing a process trouble.

PRIOR ART DOCUMENT

Korean Patent No. 10-1485567 (Jan. 16, 2015)

Korean Laid-open Patent No. 10-2011-0101386 (Sep. 16, 2011)

U.S. Pat. No. 9,266,910 (Feb. 23, 2016)

DISCLOSURE OF THE INVENTION

Technical Problem

The present invention is devised to solve the above-described problems, and provides a novel metallocene catalyst and a method for preparing a polyolefin resin showing a high molecular weight and a low melt index by using the same.

Technical Solution

In order to solve the above-mentioned tasks, the present invention provides a transition metal compound represented by formula 1 below:

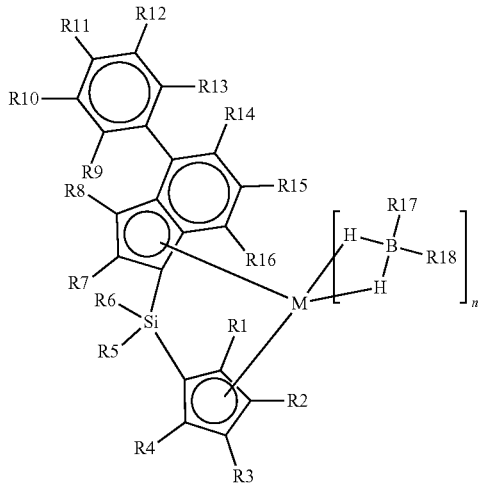

[Formula 1]

In Formula 1 above,

M is a Group 4 transition metal;

R1, R2, R3 and R4 are each independently hydrogen; $(C_1-C_{20})$alkyl including or not including acetal, ketal or an ether group; $(C_2-C_{20})$alkenyl including or not including acetal, ketal or an ether group; $(C_6-C_{20})$aryl including or not including acetal, ketal or an ether group; $(C_1-C_{20})$alkyl($C_6-C_{20}$)aryl including or not including acetal, ketal or an ether group; $(C_6-C_{20})$aryl($C_1-C_{20}$)alkyl including or not including acetal, ketal or an ether group; or $(C_1-C_{20})$ silyl including or not including acetal, ketal or an ether group; and two or more among R1, R2, R3, and R4 are able to be connected with each other to form an aliphatic ring or an aromatic ring;

R5, R6, R7 and R8 are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl($C_6-C_{20}$)aryl including or not including acetal, ketal or an ether group;

R9, R10, R11, R12, R13, R14, R15 and R16 are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl($C_6-C_{20}$)aryl including or not including acetal, ketal or an ether group; $(C_6-C_{20})$aryl($C_1-C_{20}$)alkyl including or not including acetal, ketal or an ether group; or $(C_1-C_{20})$ silyl including or not including acetal, ketal or an ether group; and two or more among R9, R10, R11, R12, R13, R14, R15 and R16 are able to be connected with each other to form an aliphatic ring or an aromatic ring;

R17 and R18 are each independently hydrogen, $(C_1-C_{20})$alkyl, $(C_2-C_{20})$alkenyl, $(C_2-C_{20})$alkynyl, $(C_6-C_{20})$aryl, $(C_1-C_{20})$alkyl($C_6-C_{20}$)aryl, $(C_6-C_{20})$aryl($C_1-C_{20}$)alkyl, $(C_1-C_{20})$alkylamido, $(C_6-C_{20})$arylamido, or $(C_1-C_{20})$alkylidene; and n is an integer of 1 or 2.

In addition, there is provided a transition metal compound characterized in that at least one among R1, R2, R3 and R4 above may be hydrogen, and the others may be each independently able to be substituted with $(C_1-C_{20})$alkyl, $(C_2-C_{20})$alkenyl, $(C_6-C_{20})$aryl or $(C_1-C_{20})$silyl including or not including acetal, ketal, or an ether group; and two or more among R1, R2, R3 and R4 above are able to be connected with each other to form an aliphatic ring or an aromatic ring.

In addition, there is provided a transition metal compound characterized in that at least one among R1, R2, R3 and R4 above may be hydrogen, and the others may be each independently substituted with $(C_1-C_{20})$alkyl.

In addition, there is provided a transition metal compound characterized in that at least two among R1, R2, R3 and R4 above may be hydrogen, and the others may be each independently able to be substituted with $(C_1-C_{20})$alkyl, $(C_2-C_{20})$alkenyl, $(C_6-C_{20})$aryl or $(C_1-C_{20})$silyl including or not including acetal, ketal, or an ether group; and two or more among R1, R2, R3 and R4 above are able to be connected with each other to form an aliphatic ring or an aromatic ring.

In addition, there is provided a transition metal compound characterized in that at least two among R1, R2, R3 and R4 above may be hydrogen, and the others may be each independently substituted with $(C_1-C_{20})$alkyl.

In addition, there is provided a transition metal catalyst composition including: the aforementioned transition metal compound; at least one cocatalyst compound selected from the group consisting of an aluminum compound represented by Formula 2 below, an alkyl metal compound represented by Formula 3 below, and a boron compound represented by Formula 4 below:

$$—[Al(R19)-O]n-$$ [Formula 2]

In Formula 2, R19 is a halogen radical, or a halogen-substituted or unsubstituted $C_1-C_{20}$ hydrocarbyl radical; and n is an integer of 2 or more.

$$A(R20)_3$$ [Formula 3]

In Formula 3, A is aluminum or boron; and R20's are the same as or different from each other, and each independently a halogen radical, or a halogen-substituted or unsubstituted $C_1-C_{20}$ hydrocarbyl radical.

$$[L-H]^+[Z(B)_4]^- \text{ or } [L]^+[Z(B)_4]^-$$ [Formula 4]

In Formula 4, L is a neutral or cationic Lewis acid; H is a hydrogen atom;

Z is a Group 13 element; and B is each independently a $C_6-C_{20}$ aryl or alkyl radical having at least one hydrogen atom substituted with a halogen radical, a $C_1-C_{20}$ hydrocarbyl radical, a $C_1-C_{20}$ alkoxy radical, or a $C_1-C_{20}$ phenoxy radical.

Further, there is provided a transition catalyst composition characterized in that the aluminum compound cocatalyst is one selected from alkylaluminoxane or organic aluminum or a mixture of two or more thereof, and is a single one selected from among methylaluminoxane, modified methylaluminoxane, tetraisobutylaluminoxane, trimethylaluminum, triethylaluminum, triisobutylaluminum and trioctylaluminum, or a mixture of two or more thereof, and the boron compound cocatalyst is a single one selected from among tris(pentafluorophenyl)borane, N,N-dimethylanilinium tetrakis(pentafluorophenyl)borate and triphenylmethylinium tetrakis(pentafluorophenyl)borate, or a mixture thereof.

In addition, the present invention provides a method for preparing a polyolefin including a step for polymerizing olefin-based monomers in the presence of the transition metal catalyst composition.

In addition, there is provided a method for preparing a polyolefin characterized in that the olefin-based monomers include at least one selected from the group consisting of ethylene, propylene, 1-butene, 1-pentene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene.

In addition, there is provided the method for preparing a polyolefin characterized in that particles of 125 μm or less are produced by 0.5 wt % or less.

Advantageous Effects

The novel metallocene catalyst according to the present invention compared to the conventional catalyst enables the production of a polyolefin having an excellent activity and a high molecular weight and a low melt index. In addition, the production of fine particles due to the leaching phenomenon during the polymerization of a polyolefin may be minimized.

MODE FOR CARRYING OUT THE INVENTION

Hereinafter, preferred embodiments of the present invention will be described in detail. In describing the present invention, if a detailed description relating to well-known technology is considered to obscure the subject matter of the present invention, the detailed description may be omitted. Throughout the specification, a part is referred to "include" an element, the part does not exclude other elements but may further include other elements unless otherwise indicated.

The present invention provides a transition metal compound represented by formula 1 below:

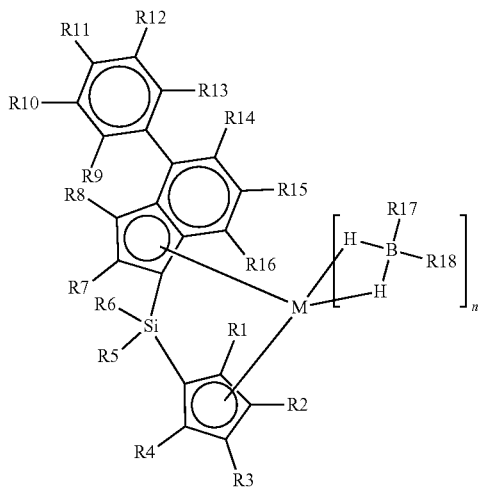

[Formula 1]

In Formula 1 above,

M is a Group 4 transition metal;

R1, R2, R3 and R4 are each independently hydrogen; $(C_1-C_{20})$alkyl including or not including acetal, ketal or an ether group; $(C_2-C_{20})$alkenyl including or not including acetal, ketal or an ether group; $(C_6-C_{20})$aryl including or not including acetal, ketal or an ether group; $(C_1-C_{20})$alkyl$(C_6-C_{20})$aryl including or not including acetal, ketal or an ether group; $(C_6-C_{20})$aryl$(C_1-C_{20})$alkyl including or not including acetal, ketal or an ether group; or $(C_1-C_{20})$ silyl including or not including acetal, ketal or an ether group; and two or more among R1, R2, R3, and R4 are able to be connected with each other to form an aliphatic ring or an aromatic ring;

R5, R6, R7 and R8 are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl$(C_6-C_{20})$aryl including or not including acetal, ketal or an ether group;

R9, R10, R11, R12, R13, R14, R15 and R16 are each independently hydrogen; $(C_1-C_{20})$alkyl including or not including acetal, ketal or an ether group; $(C_2-C_{20})$alkenyl including or not including acetal, ketal or an ether group; $(C_1-C_{20})$alkyl$(C_6-C_{20})$aryl including or not including acetal, ketal or an ether group; $(C_6-C_{20})$aryl$(C_1-C_{20})$alkyl including or not including acetal, ketal or an ether group; or $(C_1-C_{20})$ silyl including or not including acetal, ketal or an ether group; and two or more among R9, R10, R11, R12, R13, R14, R15 and R16 are able to be connected with each other to form an aliphatic ring or an aromatic ring;

R17 and R18 are each independently hydrogen, $(C_1-C_{20})$alkyl, $(C_2-C_{20})$alkenyl, $(C_2-C_{20})$alkynyl, $(C_6-C_{20})$aryl, $(C_1-C_{20})$alkyl$(C_6-C_{20})$aryl, $(C_6-C_{20})$aryl$(C_1-C_{20})$alkyl, $(C_1-C_{20})$alkylamido, $(C_6-C_{20})$arylamido, or $(C_1-C_{20})$alkylidene; and n is an integer of 1 or 2.

The term "alkyl" described in the present invention means a linear or branched-chain saturated monovalent hydrocarbon radical composed of only carbon and hydrogen atoms, and examples of such alkyl radical include methyl, ethyl, propyl, isopropyl, butyl, isobutyl, t-butyl, pentyl, hexyl, octyl, dodecyl, etc., but are not limited thereto.

In addition, the term "cycloalkyl" described in the present invention means a monovalent aliphatic alkyl radical composed of one ring, and examples of the cycloalkyl include cyclopropyl, cyclobutyl, cyclopentyl, cyclohexyl, cycloheptyl, cyclooctyl, cyclononyl, cyclodecyl, etc., but are not limited thereto.

In addition, the term "alkenyl" described in the present invention means a linear or branched chain hydrocarbon radical including one or more carbon-carbon double bonds, and includes ethenyl, propenyl, butenyl, pentenyl, etc., but is not limited thereto.

Furthermore, the term "aryl" described in the present invention is an organic radical derived from an aromatic hydrocarbon by the removal of one hydrogen atom and includes a single or fused ring system. Particular examples include phenyl, naphthyl, biphenyl, anthryl, fluorenyl, phenanthryl, triphenylenyl, pyrenyl, perylenyl, chrysenyl, naphthacenyl, fluoranthenyl, etc., but are not limited thereto.

In addition, the term "alkoxy" described in the present invention means a —O-alkyl radical, where "alkyl" is the same as defined above. Examples of such alkoxy radical include methoxy, ethoxy, isopropoxy, butoxy, isobutoxy, t-butoxy, etc., but are not limited thereto.

Further, the term "halogen" described in the present invention means a fluorine, chlorine, bromine or iodine atom.

In the present invention, the transition metal compound has an ansa-metallocene structure including cyclopentadiene derivative ligands which are connected with each other via a silicon or alkenylene bridge group, and an indenyl derivative ligand in which aryl is surely substituted at position 4, as represented by Formula 1.

As described above, the transition metal compound has an indene derivative ligand in which aryl is substituted at position 4, and thus has excellent catalyst activity and copolymerization degree when compared with a transition metal compound having a ligand in which an aryl group is unsubstituted at position 4 of indene.

Here, the transition metal compound according to the present invention preferably has the structure of chemical formula 1, wherein at least one, preferably, two or more among R1, R2, R3 and R4 are hydrogen, and the rest thereof may be each independently able to be substituted with $(C_1-C_{20})$alkyl, $(C_2-C_{20})$alkenyl, $(C_6-C_{20})$aryl, or $(C_1-C_{20})$ silyl including or not including acetal, ketal or an ether group; and two or more among R1, R2, R3 and R4 are able to be connected with each other to form an aliphatic ring or an aromatic ring, and more preferably, in case where at least one, preferably, two or more among R1, R2, R3 and R4 are hydrogen, and the rest thereof are each independently substituted with ($C_1$-$C_{20}$)alkyl, it is possible to produce a polyolefin having an excellent activity and a high molecular weight during polymerizing an olefin using propylene or ethylene as a monomer.

Meanwhile, in order that the transition metal compound of Formula 1 becomes an active catalyst component used for polymerizing an olefin, compounds represented by Formulae 2 to 4 below, which may extract a ligand from the transition metal compound to cationize the central metal so as to act as a counterion, i.e., anion having a weak bonding force, act together as cocatalysts.

Accordingly, the present invention discloses a transition metal catalyst composition including: the transition metal compound; at least one cocatalyst compound selected from the group consisting of an aluminum compound represented by Formula 2 below, an alkyl metal compound represented by Formula 3 below, and a boron compound represented by Formula 4 below:

—[Al(R19)-O]$n$-  [Formula 2]

In Formula 2, R19 is a halogen radical, or a halogen-substituted or unsubstituted $C_1$-$C_{20}$ hydrocarbyl radical; and n is an integer of 2 or more.

A(R20)$_3$  [Formula 3]

In Formula 3, A is aluminum or boron; and R'20s are the same as or different from each other, and each independently a halogen radical, or a halogen-substituted or unsubstituted $C_1$-$C_{20}$ hydrocarbyl radical.

[L-H]$^+$[Z(B)$_4$]$^-$ or [L]$^+$[Z(B)$_4$]$^-$  [Formula 4]

In Formula 4, L is a neutral or cationic Lewis acid; H is a hydrogen atom;

Z is a Group 13 element; and B is each independently a $C_6$-$C_{20}$ aryl or alkyl radical having at least one hydrogen atom substituted with a halogen radical, a $C_1$-$C_{20}$ hydrocarbyl radical, a $C_1$-$C_{20}$ alkoxy radical, or a $C_1$-$C_{20}$ phenoxy radical.

The compound represented by Formula 2 above is not specifically limited as long as it is an alkylaluminoxane, but preferred examples include methylaluminoxane, ethylaluminoxane, isobutylaluminoxane, butylaluminoxane, etc., and particularly preferable compound is methylaluminoxane, so that the cocatalyst compound shows excellent activation effect.

The alkyl metal compound represented by Formula 3 above is not specifically limited, but preferred examples include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc., and particularly preferred compounds may be selected from among trimethylaluminum, triethylaluminum and triisobutylaluminum.

In addition, in the cocatalyst compound represented by Formula 4 above, it is preferred that [L-H]$^+$ above is a dimethylanilinium cation and [Z(A)$_4$]$^-$ above is [B(C6-F5)$_4$]$^-$, and it is preferred that [L]$^+$ above is [(C$_6$H$_5$)3C]$^+$ and [Z(A)$_4$]$^-$ above is [B(C$_6$F$_5$)$_4$]$^-$. Here, the cocatalyst compound represented by Formula 4 above is not specifically limited but non-limiting examples include triethylammoniumtetraphenylborate, tributylammoniumtetraphenylborate, trimethylammoniumtetraphenylborate, tripropylammoniumtetraphenylborate, trimethylammoniumtetra(p-tolyl)borate, tripropylammoniumtetra(p-tolyl)borate, trimethylammoniumtetra(o,p-dimethylphenyl)borate, triethylammoniumtetra(o,p-dimethylphenyl)borate, tributylammoniumtetra(p-trifluoromethylphenyl)borate, trimethylammoniumtetra(p-trifluoromethylphenyl)borate, tributylammoniumtetrapentafluorophenylborate, N,N-diethylaniliniumtetraphenylborate, N,N-diethylaniliniumtetrapentafluorophenylborate, diethylammoniumtetrapentafluorophenylborate, triphenylphosphoniumtetraphenylborate, trimethylphosphoniumtetraphenylborate, triphenylcarboniumtetra(p-trifluoromethylphenyl)borate, triphenylcarboniumtetrapentafluorophenylborate, dimethylaniliniumtetrakis(pentafluorophenyl)borate, etc.

A catalyst composition may be prepared using the compounds of Formula 1 to Formula 4 above and then used for polymerizing an olefin, and a method for preparing a catalyst composition is not specifically limited.

The added amount of the cocatalyst compound may be determined by considering the added amount of the transition metal compound represented by Formula 1 above, an amount required for sufficiently activating the cocatalyst compound, etc. The content of the cocatalyst compound may be 1:1-100,000, preferably, 1:1-10,000, more preferably, 1:1-5,000 based on the molar ratio of a metal contained in the cocatalyst compound with respect to 1 mol of a transition metal contained in the transition metal compound represented by Formula 1 above.

More specifically, in the case of the first method, the compound represented by Formula 2 above may be included in a molar ratio of 1:10-5,000, more preferably, in a molar ratio of 1:50-1,000, most preferably, in a molar ratio of 1:100-1,000 with respect to the transition metal compound represented by Formula 1 above. If the molar ratio of the compound represented by Formula 2 above with respect to the transition metal compound of Formula 1 above is less than 1:10, the amount of aluminoxane is very small, and thus the activation of a metal compound may incompletely carried out, and if the molar ratio is greater than 1:5,000, an excessive amount of aluminoxane acts as a catalyst poison, and thus the aluminoxane may inhibit a polymer chain from growing well.

In addition, in the case of the second method, when A in the cocatalyst composition represented by Formula 3 above is boron, the compound represented by Formula 3 above may be supported in a molar ratio of 1:1-100, preferably, 1:1-10, more preferably, 1:1-3 with respect to the transition metal compound represented by Formula 1 above. Also, when A in the cocatalyst compound represented by Formula 3 above is aluminum, the compound represented by Formula 3 above may be supported in a molar ratio of 1:1-1000, preferably, 1:1-500, more preferably, 1:1-100 with respect to the transition metal compound represented by Formula 1 above, even though the molar ratio may be changed according to the amount of water in a polymerization system.

In addition, the cocatalyst compound represented by Formula 4 above may be supported in a molar ratio of 1:0.5-30, preferably, 1:0.7-20, more preferably, 1:1-10 with respect to the transition metal compound represented by Formula 1 above. If the ratio of the cocatalyst compound represented by Formula 4 above is less than 1:0.5, the amount of an activating agent is relatively small, and the activation of a metal compound may be incompletely carried out, and thus, the activity of a produced catalyst composition may be degraded. If the ratio is greater than 1:30, the activation of a metal compound may be completely carried out, but due to the remaining excessive amount of activating agent, the unit cost of the catalyst composition may be economically infeasible or the purity of a produced polymer may be degraded.

Meanwhile, the catalyst according to the present invention may further include a support in the compound represented by Formula 1 above and the cocatalyst compound.

The support may be any supports of an inorganic or organic material used for the preparation of a catalyst in the art of the present invention without limitation, for example, $SiO_2$, $Al_2O_3$, MgO, $MgCl_2$, $CaCl_2$, $ZrO_2$, $TiO_2$, $B_2O_3$, CaO, ZnO, BaO, $ThO_2$, $SiO_2$—$Al_2O_3$, $SiO_2$—MgO, $SiO_2$—$TiO_2$, $SiO_2$—$V_2O_5$, $SiO_2$—$CrO_2O_3$, $SiO_2$—$TiO_2$—MgO, bauxite, zeolite, starch, cyclodextrine, a synthetic polymer, etc. may be used. Preferably, the support may include a hydroxyl group at the surface thereof, and may be one or more supports selected from the group consisting of silica, silica-alumina and silica-magnesia.

As a method for supporting the transition metal compound and the cocatalyst compound in the support, a method of directly supporting the transition metal compound in a dehydrated support, a method of supporting the transition metal compound after pre-treating the support with the cocatalyst compound, a method of supporting the transition metal compound in the support followed by post-treating with the cocatalyst compound, a method of reacting the transition metal compound with the cocatalyst compound, followed by adding a support to carry out the reaction, etc. may be used.

A solvent which can be used in the supporting methods may be an aromatic hydrocarbon-based solvent, a halogenated aliphatic hydrocarbon-based solvent, or a mixture thereof. Here, non-limiting examples of the aliphatic hydrocarbon-based solvent may include pentane, hexane, heptane, octane, nonane, decane, undecane, dodecane, etc. In addition, non-limiting examples of the aromatic hydrocarbon-based solvent may include benzene, monochlorobenzene, dichlorobenzene, trichlorobenzene, toluene, etc. In addition, non-limiting examples of the halogenated aliphatic hydrocarbon-based solvent may include dichloromethane, trichloromethane, dichloroethane, trichloroethane, etc.

In addition, a process for supporting the transition metal compound and the cocatalyst compound on a support may be advantageously carried out at a temperature of −70° C. to 200° C., preferably, −50° C. to 150° C., more preferably, 0° C. to 100° C. considering the efficiency of a supporting process.

The polyolefin catalyst prepared according to the preparation method has a high catalyst activity, the polyolefin polymerized using the catalyst has a high molecular weight and a low melt index, and thus physical properties of the polyolefin may be improved.

According to an embodiment of the present invention, a polymer, which is produced through a polymerization process performed by directly contacting an olefin monomer compound, may be prepared by olefin polymerization under the condition in which a polymer chain is rapidly fixed according to the information since a catalytic site is relatively insoluble and/or fixable. Such fixation may be performed by, for example, using a solid insoluble catalyst, generally performing polymerization in a medium insoluble for the resulting polymer, and keeping a polymerization reactant and product to less than or equal to the crystal melting point of a polymer.

The above-described metallocene catalyst composition is preferable for olefin polymerization. Therefore, the present invention discloses a method for preparing a polyolefin including a step for polymerizing olefin-based monomers in the presence of the transition metal catalyst composition. That is, the method for preparing a polyolefin according to the present invention is performed by including a step of polymerizing an olefin-based monomer compound in the presence of a transition metal catalyst composition including one or more cocatalyst compounds selected from the group consisting of the transition metal compound represented by Formula 1 above, the aluminum compound represented by Formula 2 above, the alkyl metal compound represented by Formula 3 above, and the boron compound represented by Formula 4.

A suitable polymerization process for polyolefin polymerization is well-known to a person skilled in the art, and includes bulk polymerization, solution polymerization, slurry polymerization and low-pressure vapor polymerization. The metallocene catalyst composition is particularly useful in a well-known operation type using a fixed bed, a moving bed or a slurry process, which are performed in a single, series or parallel reactor.

In case where the polymerization reaction is performed in a liquid phase or a slurry phase, a solvent or an olefin-based monomer itself may be used as a medium.

Since the catalyst composition suggested in the present invention is present in a uniform type in a polymerization reactor, the catalyst composition is preferably applied in a solution polymerization process which is performed at a temperature of the melting point or above of the polymer. However, as disclosed in U.S. Pat. No. 4,752,597, a non-uniform catalyst composition type which is obtained by supporting the transition metal catalyst and the cocatalyst on a porous metal oxide support may be used in a slurry polymerization or vapor polymerization process. Accordingly, if the catalyst composition of the present invention is used together with an inorganic support or an organic polymer support, it may be applied in a slurry or vapor phase process. That is, the transition metal compound and the cocatalyst compound may be used as a supported type in an inorganic support or an organic polymer support.

A solvent which can be used in the polymerization reaction may be an aliphatic hydrocarbon-based solvent, an aromatic hydrocarbon-based solvent, a halogenated aliphatic hydrocarbon-based solvent, or a mixture thereof. Here, non-limiting examples of the aliphatic hydrocarbon-based solvent may include pentane, hexane, heptane, octane, nonane, decane, undecane, dodecane, cyclopentane, methylcyclopentane, cyclohexane, etc. In addition, non-limiting examples of the aromatic hydrocarbon-based solvent may include benzene, monochlorobenzene, dichlorobenzene, trichlorobenzene, toluene, xylene, chlorobenzene, etc. In addition, non-limiting examples of the halogenated aliphatic hydrocarbon-based solvent may include dichloromethane, trichloromethane, dichloroethane, trichloroethane, 1,2-dichloroethane, etc.

In the present invention, the olefin-based monomer may be ethylene, propylene, 1-butene, 1-pentene, 1-hexane, 1-octene, 1-nonene, 1-decene, 1-undecene, 1-dodecene, 1-tridecene, 1-tetradecene, 1-petadecene, 1-hexadecene, 1-heptadecene, 1-octadecene, 1-nonadecene, 1-eicosene, or a mixture thereof, and preferably propylene may be used alone, or propylene and another monomer may be mixed and used.

According to an embodiment of the present invention, a method for preparing a polyolefin may be carried out by polymerizing an olefin-based monomer compound in the presence of the transition metal catalyst composition. In this case, the transition metal catalyst and the cocatalyst components may be separately injected into a reactor, or each component may be mixed in advance and then injected to the reactor. Mixing conditions such as injection order, temperature, or concentration are not specifically limited.

Meanwhile, in the polymerization reaction of the present invention, the added amount of the catalyst may be determined in a range where the polymerization reaction of a monomer may be sufficiently carried out according to a slurry phase, liquid phase, vapor phase or bulk phase process, and thus is not specifically limited. However, the added amount of the catalyst is preferably $10^{-8}$ mol/L to 1 mol/L, more preferably, $10^{-7}$ mol/L to $10^{-1}$ mol/L, and even more preferably, $10^{-7}$ mol/L to $10^{-2}$ mol/L, based on the concentration of a central metal (M) in a main catalyst compound (transition metal compound) per unit volume (L) of the monomer.

In this case, in the step for polymerizing olefin-based monomers, hydrogen may be injected, and the amount of injected hydrogen may control the length of a polyolefin chain. That is, if the amount of injected hydrogen is large, a polyolefin having a low molecular weight may be prepared, and if the amount of injected hydrogen is small, a polyolefin having a high molecular weight may be prepared. The preferred amount of injected hydrogen, which serves as this, may be 0.1-50 mg, preferably 1-30 mg, more preferably 5-20 mg, and most preferably 10-15 mg.

In addition, the polymerization reaction of the present invention is performed by a batch type, a semi-continuous type or a continuous type reaction, preferably, a continuous type reaction.

The temperature and pressure conditions of the polymerization reaction of the present invention may be determined by considering the efficiency of the polymerization reaction according to the kind of the reaction and the kind of the reactor, but the polymerization temperature may be 40-150° C., preferably, 60-100° C., and the pressure may be 1-100 atm, preferably, 5-50 atm.

The polyolefin prepared according to the present invention may increase the polymerization activity of an olefin-based monomer and show a high molecular weight and a low melt index by using a catalyst including a main catalyst compound and a cocatalyst compound.

In addition, the production of fine particles due to the leaching phenomenon during the polymerization of a polyolefin may be minimized.

In this case, the polyolefin may have a weight average molecular weight (Mw) of 10,000-1,000,000, preferably, 100,000-800,000, more preferably, 300,000-700,000, even more preferably 400,000-700,000, and most preferably 500,000-700,000.

In addition, the polyolefin may have a melt index (230° C., 2.16 kg) of 50 or less, preferably 30 or less, more preferably 20 or less, even more preferably 5 or less, and most preferably 3 or less.

In addition, the polyolefin may have isotacticity (Pentad II) of 95% or more, preferably 96% or more, more preferably 96.5% or more, and most preferably 97% or more.

In addition, the method for preparing a polyolefin may have 1 wt % or less of the produced amount of particles having a size of 125 μm or less, which are fine particles produced due to the leaching phenomenon during the polymerization of a polyolefin, preferably 0.5 wt % or less, more preferably 0.3 wt % or less, and most preferably 0.2 wt % or less.

Hereinafter, preferred embodiments according to the present invention will be explained.

Unless otherwise separately stated, all synthetic experiments of ligands and catalysts were performed in a nitrogen atmosphere using a standard Schlenk or glove box technique, organic solvents used in all reactions were used after removing moisture by refluxing in a sodium metal and benzophenone and by distilling immediately before the use. $1^H$-NMR analysis of the ligands and catalysts synthesized was performed at room temperature using Bruker 300 MHz.

A polymerization solvent, toluene was used after passing through a column filled with 5A molecular sieves and active alumina, bubbling with high purity nitrogen to sufficiently remove moisture, oxygen and other catalyst poison materials. All polymerization reactions were performed in a high-pressure autoclave which was completely blocked from exterior air after injecting a solvent, a cocatalyst, each monomer for polymerization, etc. in amounts required, and putting a catalyst in. The resulting polymers were analyzed by the methods below.

(1) Melt Index (MI)

According to ASTM D 1238, after heating to 230° C., a piston of 2.16 kg was put on a proper position in a cylinder, and a weight of a resin passed through an orifice (inner diameter: 2.09 mm, length: 8 mm) for a certain time (minute unit) was measured and converted into a passing amount for 10 minutes.

(2) Weight Average Molecular Weight (Mw) and Molecular Weight Distribution (MWD)

Measurement was performed using PL210 GPC equipped with PL Mixed-BX2+preCol at 135° C. at a rate of 1.0 ml/min in a 1,2,3-trichlorobenzene solvent, and a molecular weight was calibrated using a PL polystyrene standard material.

(3) Melting Point (Tm) Analysis

Measurement was performed using Dupont DSC2910 in a nitrogen atmosphere at a rate of 10° C./min in 2nd heating conditions.

(4) Pentad II Content Analysis

Analysis was performed through 13C-NMR analysis using JEOL 400 MHz.

(5) Distribution Analysis of Particles of 125 μm or Less

The ratio of particles passed through was determined using a 125 μm sieve.

CATALYST PREPARATION EXAMPLE 1

Synthesis of transition metal compound
[tetramethylcyclopentadienyl dimethylsilyl
2-methyl-4-(4-tert-butylphenyl)indenyl Zr
ditetrahydroborate]

1) Synthesis of Dimethyl
tetramethylcyclopentadienyl chlorosilane

To a 2-L flask, tetrahydrofuran (600 ml) and tetramethylcyclopentadiene (50 g) were added, and in a nitrogen atmosphere at −10° C., n-BuLi (2.5 M hexane solution) (170 ml) was slowly added dropwise thereto and then stirred and reacted at room temperature for 12 hours. The temperature of the reaction solution was decreased to −10° C. again, and dimethyl dichlorosilane (170 g) was added, followed by stirring and reacting at room temperature for 12 hours. Then, the reaction product was dried in vacuum. n-hexane (500 ml) was injected thereto to dissolve the reaction product, and filtering was performed using a celite filter. The filtrate was dried in vacuum to obtain 70 g of dimethyl tetramethylcyclopentadienyl chlorosilane as a yellow oil type (yield: 80%).

2) Synthesis of Dimethyl tetramethylcyclopentadienyl 2-methyl-4-(4-tert-butylphenyl)indenyl silane A flask to which toluene (200 ml), tetrahydrofuran (40 ml) and 2-methyl-4-(4-tert-butylphenyl)indene (50 g) were injected, was cooled to −10° C., and n-BuLi (2.5 M hexane solution) (76 ml) was slowly added dropwise thereto, followed by stirring at room temperature for 12 hours. The temperature of the reaction product was decreased to −10° C. again, and dimethyl tetramethylcyclopentadienyl chlorosilane (38 g) was injected, followed by stirring and reacting at room temperature for 12 hours. After the reaction was completed, water (400 ml) was injected and stirred at room temperature for 1.5 hours. The resultant product was extracted with toluene and dried in vacuum to obtain 80 g of dimethyl tetramethylcyclopentadienyl 2-methyl-4-(4-tert-butylphenyl)indenyl silane as a yellow oil type (yield 95%).

3) Synthesis of Tetramethylcyclopentadienyl dimethylsilyl 2-methyl-4-(4-tert-butylphenyl)indenyl Zr dichloride Dimethyl tetramethylcyclopentadienyl 2-methyl-4-(4-tert-butylphenyl)indenyl silane (50 g), toluene (300 ml) and diethyl ether (100 ml) were added to a flask and cooled to −10° C. Then, n-BuLi (2.5 M hexane solution) (90 ml) was slowly added dropwise thereto. After finishing the dropwise addition, the reaction temperature was elevated to room temperature, and stirring for 48 hours and filtering were performed. The filtrate thus obtained was dried in vacuum to obtain 40 g of a tetramethylcyclopentadienyl dimethylsilyl 2-methyl-4-(4-tert-butylphenyl)indenyl dilithium salt as a solid type (yield 80%), and this product was used in a subsequent reaction without purification.

The tetramethylcyclopentadienyl dimethylsilyl 2-methyl-4-(4-tert-butylphenyl)indenyl dilithium salt (40 g), toluene (40 ml) and ether (10 ml) were put in flask #1 and stirred. In flask #2, a mixture solution of toluene (30 ml) and $ZrCl_4$ (20 g) was prepared. The mixture solution in flask #2 was slowly added dropwise to flask #1 using a cannular, and the reactant was stirred at room temperature for 24 hours. After finishing the stirring, the resultant product was dried in vacuum, extracted with methylene chloride (500 ml) and filtered using a celite filter. Then, the filtrate was dried in vacuum. The solid thus obtained was washed using a 1:3 mixture solution (50 ml) of methylene chloride and n-hexane and then dried in vacuum to obtain 32 g of tetramethylcyclopentadienyl dimethylsilyl 2-methyl-4-(4-tert-butylphenyl)indenyl Zr dichloride as a yellow solid type (yield 60%).

4) Synthesis of Tetramethylcyclopentadienyl dimethylsilyl 2-methyl-4-(4-tert-butylphenyl)indenyl Zr ditetrahydroborate Tetramethylcyclopentadienyl dimethylsilyl 2-methyl-4-(4-tert-butylphenyl)indenyl Zr dichloride (5.2 g), sodium tetraborate (1.5 g), and tetrahydrofuran (100 ml) were added in a flask, and reacted at room temperature for 12 hours. Then, a solid portion was filtered, and the solution portion thus obtained was dried in vacuum to obtain a white solid. The white solid thus obtained was transferred to a flask with 500 ml of diethyl ether, and then stirred at room temperature for 5 hours. Then, an insoluble portion was removed by using a filter, and diethyl ether was volatilized in vacuum to obtain 3.3 g of tetramethylcyclopentadienyl dimethylsilyl 2-methyl-4-(4-tert-butylphenyl)indenyl Zr ditetrahydrobrate.

CATALYST PREPARATION EXAMPLE 2

Synthesis of transition metal compound [1,3,4-Trimethylcyclopentadienyl dimethylsilyl 2-methyl-4-(4-tert-butylphenyl)indenyl Zr ditetrahydroborate]

Catalyst Preparation Example 2 was prepared by the same method as Catalyst Preparation Example 1 except for using 1,3,4-trimethylcyclopentadiene instead of tetramethylcyclopentadiene.

CATALYST PREPARATION EXAMPLE 3

Synthesis of transition metal compound [4-butyl-2-methyl-methylcyclopentadienyl dimethylsilyl 2-methyl-4-(4-tert-butylphenyl)indenyl Zr ditetrahydroborate]

Catalyst Preparation Example 3 was prepared by the same method as Catalyst Preparation Example 1 except for using 4-butyl-2-methyl-cyclcopentadiene instead of tetramethylcyclopentadiene.

SUPPORTED CATALYST PREPARATION EXAMPLE 1

In a glove box, to a Schlenk flask (100 ml), silica (manufacturer: Grace, product name: XPO-2412, 2.0 g) was put, and 10 ml of an anhydrous toluene solution was added thereto. About 10.2 ml of methylaluminoxane (a 10 wt % methylaluminoxane solution in toluene, 15 mmol based on Al, manufacturer: Albemarle) was slowly added dropwise thereto at 10° C., followed by stirring at 0° C. for about 1 hour, and then, the temperature was elevated to 70° C., and stirring was performed for 3 hours, and the temperature was decreased to 25° C. Separately, in a glove box, the synthesized tetramethylcyclopentadienyl dimethylsilyl 2-methyl-4-(4-tert-butylphenyl)indenyl Zr ditetrahydrobrate (0.056 g, 100 μmol) was put in another 100 ml Schlenk flask, and this flask was taken out of the glove box, and then, 10 ml of an anhydrous toluene solution was added. A solution including the transition metal compound was slowly added to a solution including silica and methylaluminoxane at 10° C., and then, the temperature was elevated to 70° C., stirring was performed for 1 hour, the temperature was then decreased to 25° C., and stirring was performed for about 24 hours. Then, the resultant product of the reaction was washed with a sufficient amount of toluene and hexane to remove an unreacted aluminum compound. Then, the resultant product of the reaction was dried in vacuum to obtain 2.70 g of a free-flowing supported catalyst.

SUPPORTED CATALYST PREPARATION EXAMPLE 2

Supported Catalyst Preparation Example 2 was performed by the same method as Supported Catalyst Preparation Example 1 except for using tetramethylcyclopentadienyl dimethylsilyl 2-methyl-4-(4-tert-butylphenyl)indenyl Zr dichloride instead of tetramethylcyclopentadienyl dimethylsilyl 2-methyl-4-(4-tert-butylphenyl)indenyl Zr ditetrahydrobrate.

SUPPORTED CATALYST PREPARATION EXAMPLE 3

In a glove box, to a Schlenk flask (100 ml), silica (manufacturer: Grace, product name: XPO-2412, 2.0 g) was put, and 10 ml of an anhydrous toluene solution was added thereto. About 10.2 ml of methylaluminoxane (a 10 wt % methylaluminoxane solution in toluene, 15 mmol based on Al, manufacturer: Albemarle) was slowly added dropwise thereto at 10° C., followed by stirring at 0° C. for about 1 hour, and then, the temperature was elevated to 70° C., and stirring was performed for 3 hours, and the temperature was decreased to 25° C. Separately, in a glove box, the tetramethylcyclopentadienyl dimethylsilyl 2-methyl-4-(4-tert-butylphenyl)indenyl Zr dichloride (0.060 g, 100 μmol) was put in another 100 ml Schlenk flask, and this flask was taken out of the glove box, and then, 10 ml of an anhydrous toluene solution was added. A solution including the transition metal compound was slowly added to a solution including silica and methylaluminoxane at 10° C., and then, the temperature was elevated to 70° C., stirring was performed for 1 hour, the temperature was then decreased to 25° C., and stirring was performed for about 24 hours. Then, the resultant product of the reaction was washed with a sufficient amount of toluene and hexane to remove an unreacted aluminum compound.

Then, 200 μmol of N,N-dimethylaniliniumtetrakis(pentafluorophenyl)borate (0.16 g) was dissolved in 10 ml of toluene, and the mixture was injected into a reactor including the supported catalyst, and stirred at 80° C. for 1 hour. Then, catalyst was settled down and a toluene layer was separated and removed, and then the remaining toluene was removed at 40° C. at reduced pressure. Then, the resultant product of the reaction was dried in vacuum to obtain 2.8 g of a free-flowing supported catalyst.

SUPPORTED CATALYST PREPARATION EXAMPLE 4

Supported Catalyst Preparation Example 4 was performed by the same method as Supported Catalyst Preparation Example 1 except for using 1,3,4-trimethylcyclopentadienyl dimethylsilyl 2-methyl-4-(4-tert-butylphenyl)indenyl Zr ditetrahydroborate as a catalyst compound.

SUPPORTED CATALYST PREPARATION EXAMPLE 5

Supported Catalyst Preparation Example 5 was performed by the same method as Supported Catalyst Preparation Example 4 except for using 1,3,4-trimethylcyclopentadienyl dimethylsilyl 2-methyl-4-(4-tert-butylphenyl)indenyl Zr dichloride as a catalyst compound.

SUPPORTED CATALYST PREPARATION EXAMPLE 6

Supported Catalyst Preparation Example 6 was performed by the same method as Supported Catalyst Preparation Example 1 except for using 2-butyl-4-methyl-methylcyclopentadienyl dimethylsilyl 2-methyl-4-(4-tert-butylphenyl) indenyl Zr ditetrahydroborate as a catalyst compound.

SUPPORTED CATALYST PREPARATION EXAMPLE 7

Supported Catalyst Preparation Example 7 was performed by the same method as Supported Catalyst Preparation Example 4 except for using 2-butyl-4-methyl-methylcyclopentadienyl dimethylsilyl 2-methyl-4-(4-tert-butylphenyl) indenyl Zr dichloride as a catalyst compound.

EXAMPLE 1

At room temperature, the inside of a stainless-steel autoclave with an internal volume of 2 L was completely substituted with nitrogen. While keeping nitrogen purging, 2 ml of triisobutylaluminum (1 M solution in hexane) and 500 g of propylene were injected into a reactor. 50 mg of the supported catalyst prepared in Catalyst Preparation Example 1 above was dispersed in 5 ml of hexane and injected into the reactor using high pressure nitrogen. Then, polymerization was performed at 70° C. for 60 minutes. After finishing the polymerization, the reactor was cooled to room temperature, and an excessive amount of propylene was removed through a discharge line to obtain a white solid powder. The white solid powder thus obtained was dried by heating at 80° C. for 15 hours or more using a vacuum oven to prepare a final polypropylene resin.

EXAMPLE 2

Example 2 was performed by the same method as Example 1 except for adding 10 mg of hydrogen in Example 1.

EXAMPLE 3

Example 3 was performed by the same method as Example 1 except for adding 15 mg of hydrogen in Example 1.

EXAMPLE 4

Example 4 was performed by the same method as Example 1 except for using the supported catalyst prepared in Supported Catalyst Preparation Example 4 above in Example 1.

EXAMPLE 5

Example 5 was performed by the same method as Example 1 except for using the supported catalyst prepared in Supported Catalyst Preparation Example 4 above and adding 10 mg of hydrogen in Example 1.

EXAMPLE 6

Example 6 was performed by the same method as Example 1 except for using the supported catalyst prepared in Supported Catalyst Preparation Example 6 above in Example 1.

EXAMPLE 7

Example 7 was performed by the same method as Example 1 except for using the supported catalyst prepared in Supported Catalyst Preparation Example 6 above and adding 10 mg of hydrogen in Example 1.

COMPARATIVE EXAMPLE 1

Comparative Example 1 was performed by the same method as Example 1 except for using the supported catalyst prepared in Supported Catalyst Preparation Example 2 above in Example 1.

COMPARATIVE EXAMPLE 2

Comparative Example 2 was performed by the same method as Example 1 except for using the supported catalyst prepared in Supported Catalyst Preparation Example 2 above and adding 10 mg of hydrogen in Example 1.

COMPARATIVE EXAMPLE 3

Comparative Example 3 was performed by the same method as Example 1 except for using the supported catalyst prepared in Supported Catalyst Preparation Example 2 above and adding 15 mg of hydrogen in Example 1.

COMPARATIVE EXAMPLE 4

Comparative Example 4 was performed by the same method as Example 1 except for using the supported catalyst prepared in Supported Catalyst Preparation Example 3 above in Example 1.

COMPARATIVE EXAMPLE 5

Comparative Example 5 was performed by the same method as Example 1 except for using the supported catalyst prepared in Supported Catalyst Preparation Example 3 above and adding 10 mg of hydrogen in Example 1.

COMPARATIVE EXAMPLE 6

Comparative Example 6 was performed by the same method as Example 1 except for using the supported catalyst prepared in Supported Catalyst Preparation Example 3 above and adding 15 mg of hydrogen in Example 1.

COMPARATIVE EXAMPLE 7

Comparative Example 7 was performed by the same method as Example 1 except for using the supported catalyst prepared in Supported Catalyst Preparation Example 5 above in Example 1.

COMPARATIVE EXAMPLE 8

Comparative Example 8 was performed by the same method as Example 1 except for using the supported catalyst prepared in Supported Catalyst Preparation Example 5 above and adding 10 mg of hydrogen in Example 1.

COMPARATIVE EXAMPLE 9

Comparative Example 9 was performed by the same method as Example 1 except for using the supported catalyst prepared in Supported Catalyst Preparation Example 7 above in Example 1.

COMPARATIVE EXAMPLE 10

Comparative Example 10 was performed by the same method as Example 1 except for using the supported catalyst prepared in Supported Catalyst Preparation Example 7 above and adding 10 mg of hydrogen in Example 1.

Physical properties of the polymers prepared according to Examples and Comparative Examples were measured, and the results are shown in Table 1 below.

TABLE 1

| Division | PL (g) | H2 (ppm) | Tm (° C.) | Mw | MWD | MI | Pentad II (%) | 125 μm or less (%) | Activity (kg/cat-g) |
| --- | --- | --- | --- | --- | --- | --- | --- | --- | --- |
| Example 1 | 500 | 0 | 153 | 589K | 2.6 | 1.0 | 97.1 | 0.2 | 7.1 |
| Example 2 | 500 | 10 | 153 | 249K | 2.6 | 11 | 96.9 | 0.2 | 9.0 |
| Example 3 | 500 | 15 | 153 | 175K | 2.7 | 43 | 96.9 | 0.3 | 9.0 |
| Example 4 | 500 | 0 | 152 | 435K | 2.7 | 3.2 | 96.2 | 0.3 | 6.0 |
| Example 5 | 500 | 10 | 152 | 211K | 2.7 | 21 | 96.1 | 0.3 | 7.3 |
| Example 6 | 500 | 0 | 152 | 735K | 2.6 | 0.5 | 96.7 | 0.3 | 6.8 |
| Example 7 | 500 | 10 | 152 | 494K | 2.8 | 2.4 | 96.2 | 0.3 | 8.7 |
| Comparative Example 1 | 500 | 0 | 152 | 399K | 2.6 | 4.0 | 96.2 | 0.5 | 5.6 |
| Comparative Example 2 | 500 | 10 | 152 | 204K | 2.5 | 25 | 96.6 | 0.6 | 6.4 |
| Comparative Example 3 | 500 | 15 | 153 | 122K | 2.7 | 89 | 95.9 | 0.8 | 6.3 |
| Comparative Example 4 | 500 | 0 | 152 | 414K | 2.9 | 3.5 | 96.1 | 0.7 | 6.7 |
| Comparative Example 5 | 500 | 10 | 152 | 211K | 2.9 | 24 | 96.3 | 0.9 | 7.6 |
| Comparative Example 6 | 500 | 15 | 152 | 124K | 2.8 | 85 | 96.0 | 1.0 | 7.0 |
| Comparative Example 7 | 500 | 0 | 152 | 354K | 2.8 | 7.2 | 95.9 | 0.6 | 4.9 |
| Comparative Example 8 | 500 | 10 | 152 | 168K | 2.8 | 47 | 95.9 | 0.6 | 5.1 |
| Comparative Example 9 | 500 | 0 | 152 | 615K | 2.6 | 1.1 | 96.4 | 0.7 | 5.3 |
| Comparative Example 10 | 500 | 10 | 152 | 398K | 2.7 | 6.3 | 96.3 | 0.6 | 5.9 |

Referring to Table 1, it may be found that a polymer exhibiting excellent catalyst activity and having a high molecular weight and a low melt index may be prepared by preparing a polymer by directly contacting propylene using a specific metallocene catalyst system according to the present invention (Examples 1, 4 and 6). Also, it is shown that during supporting the metallocene catalyst, leaching of catalyst does not occur, and thus the produced amount of fine particles of 125 μm or less is very small. Meanwhile, it may be found that when hydrogen is added during the polymerization of polypropylene by using the catalyst compound according to the present invention (Examples 2, 3, 5 and 7), molecular weight distribution, isotacticity (Pentad II), the produced amount of fine particles, and activity of catalyst are the same level, and a molecular weight and melt index are regulated. In particular, it may be found that when a catalyst in which two hydrogen atoms are bonded to a cyclopentadienyl group in a specific metallocene catalyst system according to the present invention was used (Examples 6 and 7), a polymer having a higher molecular weight and a lower melt index was prepared compared to that of other Examples and Comparative Examples in which propylene was polymerized in the same conditions.

Meanwhile, when a catalyst in which a borate is not bonded to a transition metal is used (Comparative Examples 1 to 10), a polypropylene shows a lower molecular weight and a lower melt index, and a catalyst shows a lower activity compared to Examples in the same polymerization conditions.

In addition, it may be found that when a borate is used as a cocatalyst during supporting to increase the activity of the metallocene catalyst (Comparative Examples 4 to 6), a polypropylene shows a lower molecular weight and a lower melt index, as well as the produced amount of fine particles of 125 μm or less due to leaching of a catalyst is largely increased compared to Examples in the same polymerization conditions.

Hitherto, the preferred examples of the present invention have been described in detail. The description of the present invention is only for illustration, and it could be understood that particular embodiment could be easily changed without changing the technical spirit or essential features of the present invention by one of ordinary skilled in the art.

Accordingly, it should be interpreted that the scope of the present invention is represented by claims hereinafter rather than the detailed description, and all changes or modifications derived from the meaning, range and equivalent concept of claims are included in the scope of the present invention.

The invention claimed is:
1. A transition metal compound represented by Formula 1 below:

[Formula 1]

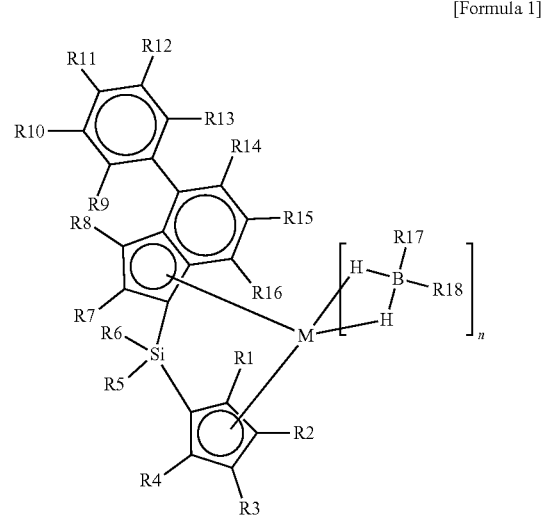

wherein, in Formula 1,
M is a Group 4 transition metal;
R1, R2, R3 and R4 are each independently hydrogen; $(C_1$-$C_{20})$alkyl including or not including acetal, ketal or an ether group; $(C_2$-$C_{20})$alkenyl including or not including acetal, ketal or an ether group; $(C_6$-$C_{20})$aryl including or not including acetal, ketal or an ether group; $(C_1$-$C_{20})$alkyl$(C_6$-$C_{20})$aryl including or not including acetal, ketal or an ether group; $(C_6$-$C_{20})$aryl$(C_1$-$C_{20})$alkyl including or not including acetal, ketal or an ether group; or $(C_1$-$C_{20})$ silyl including or not including acetal, ketal or an ether group; and two or more among R1, R2, R3, and R4 are able to be connected with each other to form an aliphatic ring or an aromatic ring;
R5, R6, R7 and R8 are each independently hydrogen; $(C_1$-$C_{20})$alkyl including or not including acetal, ketal or an ether group; $(C_2$-$C_{20})$alkenyl including or not including acetal, ketal or an ether group; $(C_1$-$C_{20})$alkyl$(C_6$-$C_{20})$aryl including or not including acetal, ketal or an ether group;
R9, R10, R11, R12, R13, R14, R15 and R16 are each independently hydrogen; $(C_1$-$C_{20})$alkyl including or not including acetal, ketal or an ether group; $(C_2$-$C_{20})$alkenyl including or not including acetal, ketal or an ether group; $(C_1$-$C_{20})$alkyl$(C_6$-$C_{20})$aryl including or not including acetal, ketal or an ether group; $(C_6$-$C_{20})$aryl$(C_1$-$C_{20})$alkyl including or not including acetal, ketal or an ether group; or $(C_1$-$C_{20})$silyl including or not including acetal, ketal or an ether group; and two or more among R9, R10, R11, R12, R13, R14, R15 and R16 are able to be connected with each other to form an aliphatic ring or an aromatic ring;
R17 and R18 are each independently hydrogen, $(C_1$-$C_{20})$alkyl, $(C_2$-$C_{20})$alkenyl, $(C_2$-$C_{20})$alkynyl, $(C_6$-$C_{20})$aryl, $(C_1$-$C_{20})$alkyl$(C_6$-$C_{20})$aryl, $(C_6$-$C_{20})$aryl$(C_1$-$C_{20})$alkyl, $(C_1$-$C_{20})$alkylamido, $(C_6$-$C_{20})$arylamido, or $(C_1$-$C_{20})$alkylidene; and
n is an integer of 1 or 2.

2. The transition metal compound of claim 1, wherein at least one among R1, R2, R3 and R4 above is hydrogen, and the others are each independently able to be substituted with ($C_1$-$C_{20}$)alkyl, ($C_2$-$C_{20}$)alkenyl, ($C_6$-$C_{20}$)aryl or ($C_1$-$C_{20}$) silyl including or not including acetal, ketal, or an ether group; and two or more among R1, R2, R3 and R4 above are able to be connected with each other to form an aliphatic ring or an aromatic ring.

3. The transition metal compound of claim 1, wherein at least one among R1, R2, R3 and R4 above is hydrogen, and the others are each independently substituted with ($C_1$-$C_{20}$) alkyl.

4. The transition metal compound of claim 1, wherein at least two among R1, R2, R3 and R4 above are hydrogen, and the others are each independently able to be substituted with ($C_1$-$C_{20}$)alkyl, ($C_2$-$C_{20}$)alkenyl, ($C_6$-$C_{20}$)aryl or ($C_1$-$C_{20}$) silyl including or not including acetal, ketal, or an ether group; and two or more among R1, R2, R3 and R4 above are able to be connected with each other to form an aliphatic ring or an aromatic ring.

5. The transition metal compound of claim 1, wherein at least two among R1, R2, R3 and R4 above are hydrogen, and the others are each independently substituted with ($C_1$-$C_{20}$) alkyl.

6. A transition metal catalyst composition comprising:
the transition metal compound according to claim 1; and
at least one cocatalyst compound selected from the group consisting of an aluminum compound represented by Formula 2 below, a compound represented by Formula 3 below, and a boron compound represented by Formula 4 below:

$$-[Al(R19)-O]n- \qquad \text{[Formula 2]}$$

wherein, in Formula 2, R19 is a halogen radical, or a halogen-substituted or unsubstituted $C_1$-$C_{20}$ hydrocarbyl radical; and n is an integer of 2 or more, $$A(R20)_3 \qquad \text{[Formula 3]}$$

in Formula 3, A is aluminum or boron; and R20's are the same as or different from each other, and each independently a halogen radical, or a halogen-substituted or unsubstituted $C_1$-$C_{20}$ hydrocarbyl radical, $$[L\text{-}H]^+[Z(B)_4]^- \text{ or } [L]^+[Z(B)_4]^- \qquad \text{[Formula 4]}$$

in Formula 4, L is a neutral or cationic Lewis acid; H is a hydrogen atom; and

Z is a Group 13 element; and Bs are each independently a $C_6$-$C_{20}$ aryl or alkyl radical having at least one hydrogen atom substituted with a halogen radical, a $C_1$-$C_{20}$ hydrocarbyl radical, a $C_1$-$C_{20}$ alkoxy radical, or a $C_1$-$C_{20}$ phenoxy radical.

7. The transition metal catalyst composition of claim 6, wherein the aluminum compound cocatalyst is one selected from alkylaluminoxane, and is a single one selected from among methylaluminoxane, modified methylaluminoxane, tetraisobutylaluminoxane, and the compound represented by Formula 3 is one selected from trimethylaluminum, triethylaluminum, triisobutylaluminum and trioctylaluminum, or a mixture of two or more thereof, and the boron compound cocatalyst is a single one selected from among tris(pentafluorophenyl)borane, N,N-dimethylanilinium tetrakis(pentafluorophenyl)borate and triphenylmethylinium tetrakis (pentafluorophenyl)borate, or a mixture thereof.

8. A method for preparing a polyolefin, the method comprising a step for polymerizing olefin-based monomers in the presence of the transition metal catalyst composition of claim 6.

9. The method for preparing a polyolefin of claim 8, wherein the olefin-based monomers comprise at least one selected from the group consisting of ethylene, propylene, 1-butene, 1-pentene, 1-hexene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-nonadecene, and 1-eicosene.

10. The method for preparing a polyolefin of claim 8, wherein particles of 125 μm or less are produced by 0.5 wt % or less.

* * * * *